(12) United States Patent
Rasmussen

(10) Patent No.: US 7,845,880 B2
(45) Date of Patent: Dec. 7, 2010

(54) SYSTEMS AND METHODS FOR HARNESSING WAVE ENERGY

(76) Inventor: Rodney Ashby Rasmussen, 2149 S. 2200 East, Salt Lake City, UT (US) 84109

( * ) Notice: Subject to any disclaimer, the term of this patent is extended or adjusted under 35 U.S.C. 154(b) by 138 days.

(21) Appl. No.: 12/248,575

(22) Filed: Oct. 9, 2008

(65) Prior Publication Data

US 2010/0092242 A1 Apr. 15, 2010

(51) Int. Cl.
*E02B 9/08* (2006.01)
(52) U.S. Cl. .............................. 405/76; 405/75; 60/507; 290/42
(58) Field of Classification Search .................. 705/76, 705/75; 290/42, 53; 60/507, 497
See application file for complete search history.

(56) References Cited

U.S. PATENT DOCUMENTS

| | | | | | |
|---|---|---|---|---|---|
| 855,258 | A | * | 5/1907 | Neal | 405/76 |
| 1,393,472 | A | * | 10/1921 | Williams | 405/76 |
| 2,640,326 | A | * | 6/1953 | Hunter | 405/76 |
| 2,783,022 | A | * | 2/1957 | Salzer | 405/76 |
| 4,122,676 | A | * | 10/1978 | Kikut | 405/76 |
| 4,204,406 | A | * | 5/1980 | Hopfe | 405/76 |
| 4,208,877 | A | | 6/1980 | Evans et al. | |
| 4,228,360 | A | | 10/1980 | Navarro | |
| 5,066,867 | A | | 11/1991 | Shim | |
| 5,176,552 | A | * | 1/1993 | Kuboyama et al. | 290/42 |
| 5,424,582 | A | | 6/1995 | Trepl, II et al. | |
| 5,808,368 | A | * | 9/1998 | Brown | 290/42 |
| 6,695,536 | B2 | | 2/2004 | Sanchez Gomez | |
| 6,781,253 | B2 | * | 8/2004 | Newman | 405/76 |
| 7,045,912 | B2 | | 5/2006 | Leijon et al. | |
| 7,076,949 | B2 | | 7/2006 | Fernandez Gomez et al. | |
| 7,245,041 | B1 | * | 7/2007 | Olson | 290/42 |
| 7,319,278 | B2 | | 1/2008 | Gehring | |
| 2003/0091393 | A1 | * | 5/2003 | Flory | 405/76 |
| 2004/0103658 | A1 | | 6/2004 | Laveria | |
| 2005/0035602 | A1 | | 2/2005 | Gard | |
| 2007/0154263 | A1 | * | 7/2007 | Morrison | 405/76 |
| 2008/0053084 | A1 | | 3/2008 | Stansby et al. | |
| 2008/0129052 | A1 | | 6/2008 | Rourke | |
| 2008/0197631 | A1 | * | 8/2008 | Medina et al. | 290/42 |
| 2008/0267712 | A1 | * | 10/2008 | Jean et al. | 405/76 |
| 2010/0045044 | A1 | * | 2/2010 | Patterson | 290/53 |

FOREIGN PATENT DOCUMENTS

| | | | |
|---|---|---|---|
| DE | 3922724 A1 | * | 1/1991 |
| JP | 55-040300 A | | 3/1980 |
| JP | 63-080078 A | | 4/1988 |
| JP | 2002-221142 A | | 9/2002 |
| JP | 2007-162669 A | | 6/2007 |

* cited by examiner

*Primary Examiner*—Frederick L Lagman
(74) *Attorney, Agent, or Firm*—Kory D. Christensen; Stoel Rives LLP

(57) ABSTRACT

Systems and methods are disclosed for harnessing wave energy. In one embodiment, a wave energy conversion device comprises a buoyant component connected to a generator such that wave energy is transferable from the buoyant component to the generator. A restricting mechanism connected with the buoyant component, is configured to selectively restrict the buoyant component from rising strictly along with passing waves. The restricting mechanism may be selectively released at an optimal time during a passing wave. In some embodiments, a system may include an array of wave energy conversion devices and a communications network. The communications network may allow for each of the buoyant components in the array to be released at an optimal time in sequential fashion.

62 Claims, 11 Drawing Sheets

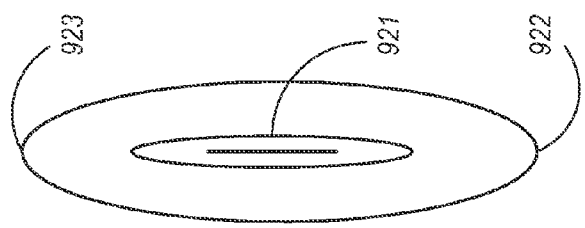
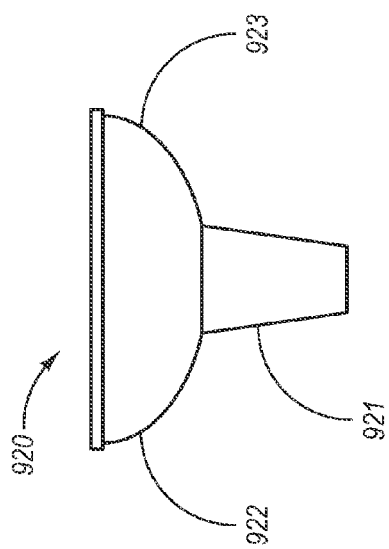
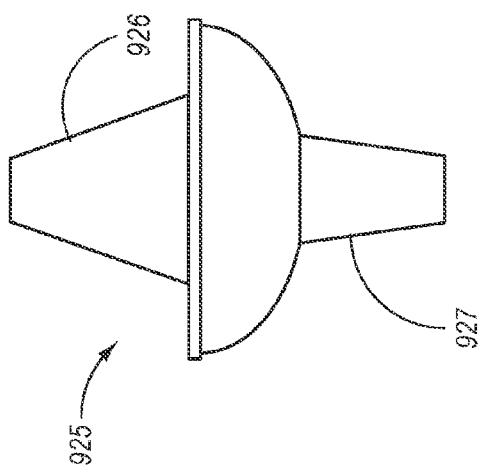
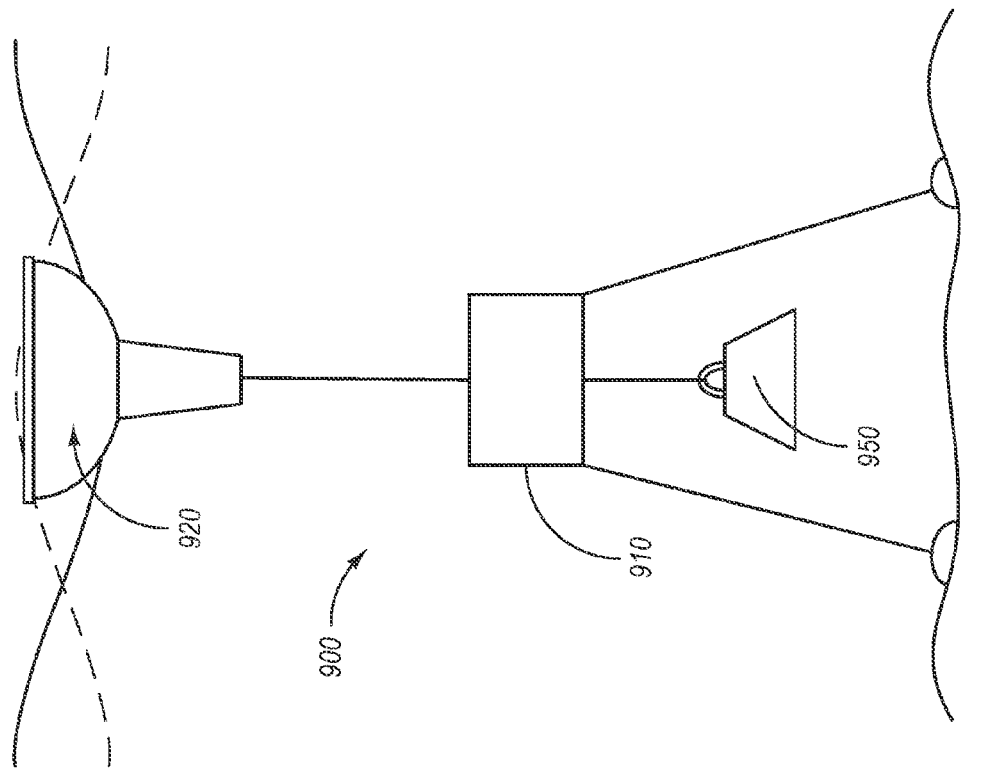

ies in which:
SYSTEMS AND METHODS FOR HARNESSING WAVE ENERGY

SUMMARY

Disclosed herein are systems and methods for harnessing wave energy. A wave energy conversion device may comprise a buoyant component disposed at the surface of a body of water. The buoyant component may be connected with a submersed platform that may contain components configured to restrict the buoyant component from rising strictly along with passing waves. Once the buoyant component reaches an ideal position, the restricting mechanism may be released, thereby allowing the buoyant component to quickly rise to the top of the wave. An ideal position for releasing the restricting mechanism may be the point where the buoyant component travels the maximum distance in the shortest time interval, or may be the point where the buoyant component ascends to the surface at substantially the same time as a crest of passing waves. The energy harnessed from passing waves may be converted into electrical energy, may be used to power an air or water pump, or may be used to perform other useful work.

One or more sensors may be employed to identify characteristics of passing waves. Information from these sensors may be used to maximize the power harnessed from passing waves. Information generated by sensors may be transmitted to one or more of the components in the submersed platform to select an appropriate time to release the buoyant component. An array of these sensors may be used such that each of the sensors serves as a node in an information network.

In some embodiments, the system may include an array of wave energy conversion devices. Each wave energy conversion device may use sensors to obtain information about passing waves, and may communicate that information to other wave energy conversion devices in the array. Communication between the wave energy conversion devices may allow for the release of each buoyant component in the system at an optimal time. An optimal time for releasing each buoyant component in the system may be the point at which the buoyant component travels the maximum distance in the shortest time interval, or may be the point where the buoyant component ascends to the surface at substantially the same time as a crest of passing waves. The release of buoyant components within an array may also be coordinated such that an optimal point for the release of each buoyant component is timed so that the average power output of the system remains consistent. For example, the release of two buoyant components may be coordinated such that the point of peak power generation from one wave energy conversion device coincides with the lowest point of power generation of the other device.

Additional aspects and advantages will be apparent from the following detailed description of preferred embodiments, which proceeds with reference to the accompanying drawings.

BRIEF DESCRIPTION OF THE DRAWINGS

Understanding that drawings depict only certain preferred embodiments and are therefore not to be considered limiting, the preferred embodiments will be described and explained with additional specificity and detail through the use of the accompanying drawings in which:

FIG. 9A illustrates a wave energy conversion device comprising a buoyant component that is configured to orient its major axis with the direction of propagation of passing waves.

FIGS. 9B and 9C illustrate alternative embodiments of a buoyant component that is configured to orient its major axis with the direction of propagation of passing waves.

FIG. 9D shows a bottom view of the embodiments of the buoyant component shown in FIGS. 9B and 9C.

DETAILED DESCRIPTION OF PREFERRED EMBODIMENTS

In the following description, numerous specific details are provided for a thorough understanding of specific embodiments. However, those skilled in the art will recognize that the invention can be practiced without one or more of the specific details, or with other methods, components, materials, etc.

In some cases, well-known structures, materials, or operations are not shown or described in detail in order to avoid obscuring aspects of the preferred embodiments. Furthermore, the described features, structures, or characteristics may be combined in any suitable manner in one or more embodiments.

Figure 1:
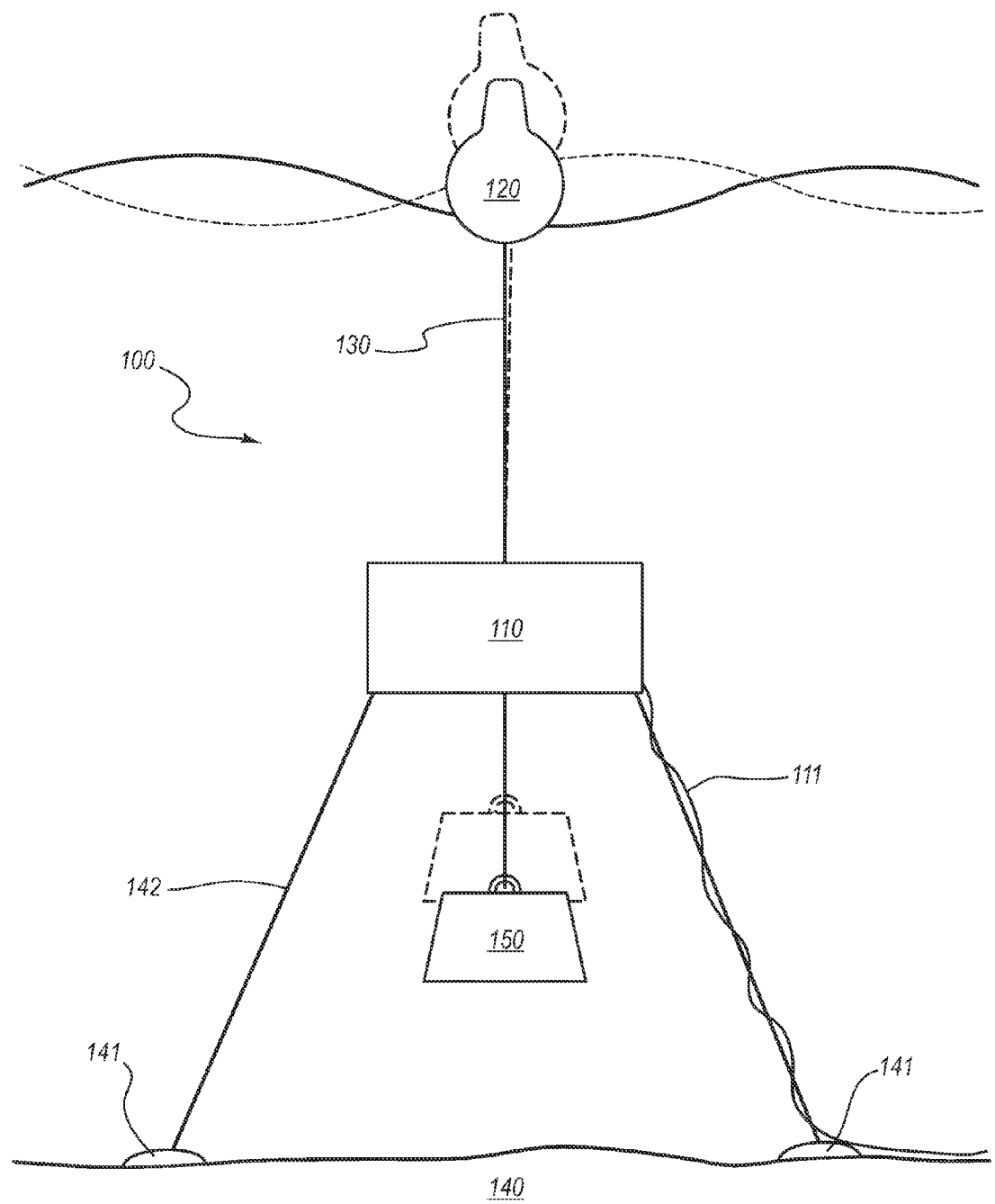
FIG. 1 illustrates an exemplary wave energy conversion device.

FIG. 1 illustrates a wave energy conversion system 100 for harnessing wave energy. In one embodiment, the system comprises a submersed platform 110 positioned under the surface of a body of water. The submersed platform 110 may be buoyant, and the submersed platform 110 may be moored to the sea floor 140 by a mooring cable 142 connected to an anchor 141 embedded in the sea floor. In embodiments where the submersed platform is buoyant, the submersed platform 110 may be filled with gas. In the alternate, buoyant structures may be attached to the submersed platform 110. In other embodiments, the submersed platform 110 may be moored to the sea floor using a rigid structure. The submersed platform 110 is connected to a buoyant component 120 using a cable 130. As a wave passes, the buoyant component 120 rises along with the wave and moves relative to the submersed platform 110. The movement of the buoyant component 120 caused by a passing wave is shown in phantom. The submersed platform 110 may contain components for harnessing the energy generated by the motion of the buoyant component 120. The buoyant component 120 may be connected to a weight 150, which rises as a passing wave lifts the buoyant component 120. The weight 150 may keep the cable 130 taut as the buoyant component 120 falls along with a passing wave. The kinetic energy from the rise and fall of the buoyant component 120 may be converted into other forms of energy (e.g., electrical power) or may be used to store potential energy in another system (e.g., compressing air in a reservoir, pumping water into an elevated reservoir). The output of the wave energy conversion system 100 (e.g., electricity) may be conducted to shore using a line 111.

Figure 2:
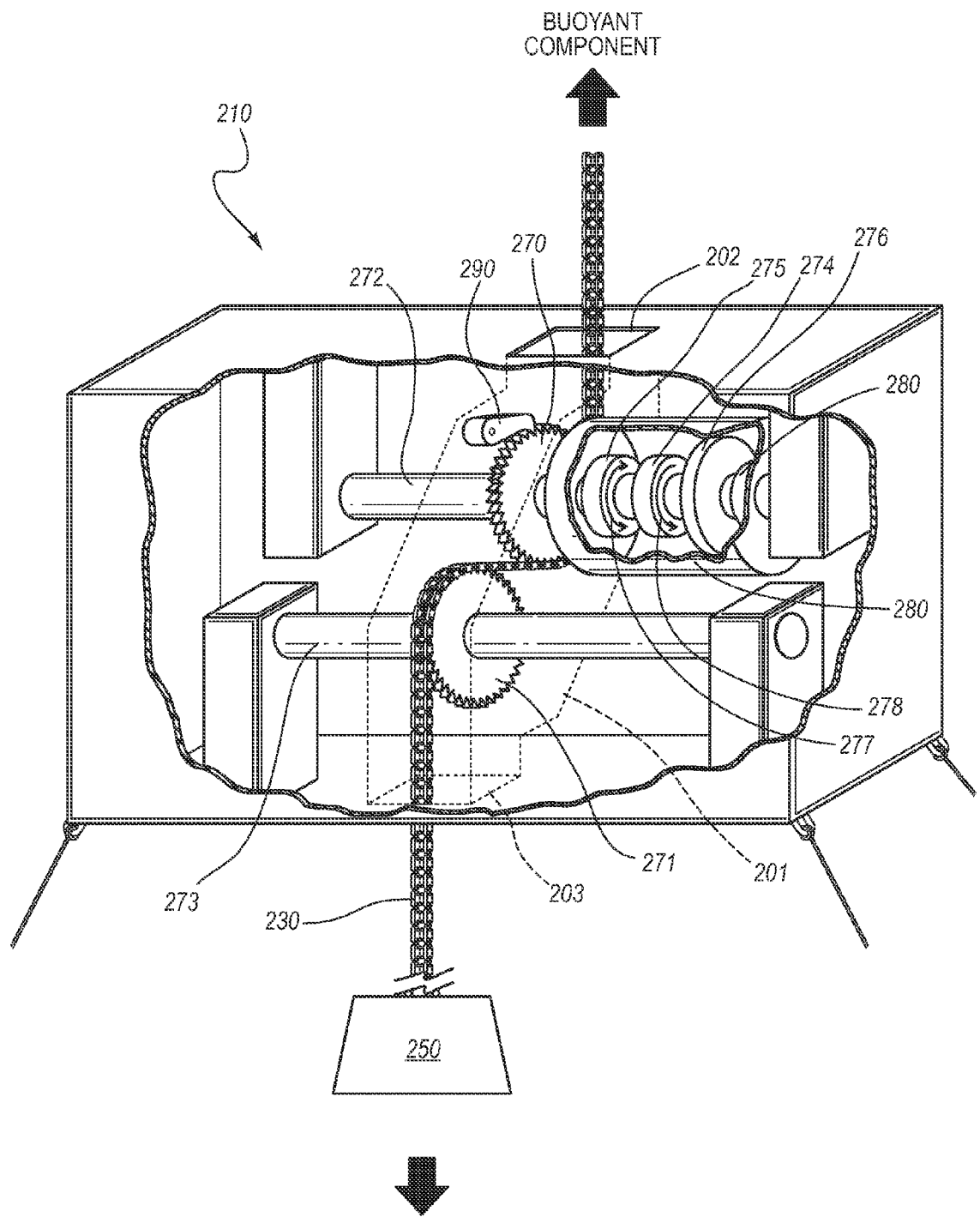
FIG. 2 illustrates an exemplary configuration of components housed within a submersed platform.

FIG. 2 shows a cut-away view of an exemplary configuration of components housed within a submersed platform 210 that may be used to harness wave energy. In an embodiment where the submersed platform 210 is buoyant, the submersed platform 210 may include a compartment 201 (shown in phantom) through which a chain 230 passes, and which is open to the water. Apart from the compartment 201, the submersed platform 210 may be filled with air or another gas to provide buoyancy and to protect the components within the submersed platform 210 from the corrosive effects of sea water. The chain 230 connects to a buoyant component at one end with a weight 250 at the other end. The submersed platform 210 may have an opening 202 at the top and an opening 203 at the bottom through which the chain 230 passes. The chain 230 is fed through two gears 270, 271 in the submersed platform. The gears 270, 271 are connected to driveshafts 272, 273, and convert the rising and falling motion of the chain 230 to a rotary motion, which may be used to turn the input of a generator 280.

Various components may be employed to control the transfer of wave energy to the input of the generator 280. In the illustrated embodiment, driveshaft 272 is connected to a clutch 275, a freewheel 274, and a flywheel 276. The output of the flywheel 276 may be connected to the input of the generator 280. As illustrated by arrow 277, the motion of the buoyant component will cause gear 270 to rotate in both a clockwise direction (corresponding to the downward motion of the buoyant component) and a counter-clockwise direction (corresponding to the upward motion of the buoyant component). The clutch 275 may selectively couple its input and output such that the output of the clutch 275 is driven by the input only in the direction of rotation corresponding to the upward motion of the buoyant component. As indicated by the arrow 278, the output of the clutch 275 only rotates in the direction corresponding to the upward motion of the buoyant component. The output of the clutch 275 may be connected to a freewheel 274 that operates to disengage the input of the freewheel 274 from the output when the output is rotating faster than the input. The output of the freewheel 274 may be coupled to a flywheel 276, which may serve to store kinetic energy and maintain the rotation of the input to the generator 280 between waves. These components may provide a relatively constant rotary input to the generator 280.

The generator 280 may be embodied as an energy conversion device that converts the kinetic energy of the motion of the buoyant component to another form of energy. For example, the generator 280 may be an electromechanical generator, a water pump, an air pump, etc. In other embodiments, a generator may function similar to the regenerative braking system on a hybrid automobile. A constant input may be important when the generator 280 is an electromechanical generator so that the power output is constant and at a desired frequency. Where a rotary input of varying direction and speed is acceptable, the driveshaft 272 may be directly connected to the input of the generator 280.

The submersed platform 210 may house a restricting mechanism that restricts the buoyant component from rising strictly along with passing waves. The ratcheting mechanism 290 is one embodiment of a restricting mechanism. The ratcheting mechanism 290 may restrain the buoyant component to a point where the buoyant component ascends to the surface at substantially the same time as the crest of a passing wave. The ratcheting mechanism 290 may allow the gears 270, 271 to rotate in one direction, but may selectively restrain the rotation of the gears 270, 271 in the other direction.

Figure 3:
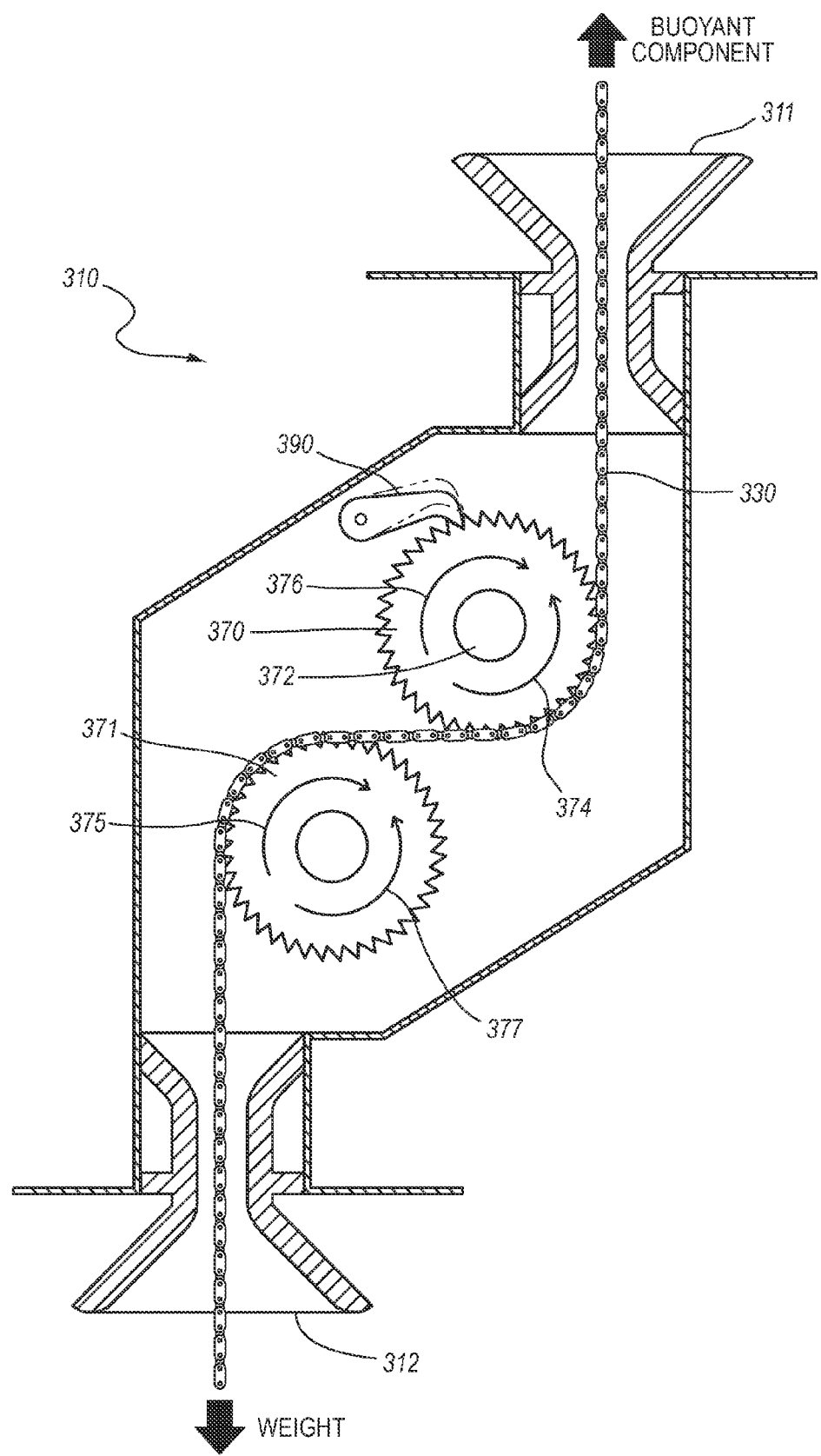
FIG. 3 shows a side view of an exemplary configuration of components for connecting a buoyant component to a submersed platform and for selectively restricting the buoyant component from rising strictly along with passing waves.

FIG. 3 shows a side view of a ratcheting mechanism 390 that may restrict a buoyant component from rising strictly along with passing waves. The gears 370, 371 have a plurality of teeth that engage with a chain 330 and transfer motion between the buoyant component, the weight, and the gears 370, 371. The teeth of the gears 370, 371 may be slanted. When the gear 370 rotates in the direction indicated by arrow 376, the ratchet 390 slides over each tooth in turn (as shown in phantom). The buoyant force on the buoyant component caused by a passing wave causes the gears 370, 371 to rotate in the direction indicated by arrows 374, 375, respectively. The arrows 376, 377 indicate the direction of rotation caused by the falling motion of a passing wave and the bias of the weight.

To allow the ratcheting mechanism 390 to be released at an optimal time, the ratcheting mechanism 390 may be coupled with sensors (not shown) or a communications system coupled to other wave energy conversion devices (not shown) that provide information about the wave. The information about the wave may be used to determine an optimal time for the buoyant component to be released (e.g. at a time that maximizes the amount of energy that may be harnessed from each wave). One or more sensors may also be positioned adjacent to the buoyant component to identify characteristics such as height, speed of propagation, direction, and duration of a wave that is heading towards the buoyant component. Information from these sensors may then be transmitted to one or more of the components in the submersed platform 310 to select an appropriate time to actuate the ratcheting mechanism 390 and thereby release the buoyant component. In an alternative embodiment, the ratcheting mechanism 390 may be released when the buoyant force on the buoyant component reaches a threshold level, such as a pre-specified torque exerted on the driveshaft 372.

FIG. 3 also illustrates funnel-shaped structures 311, 312 which align the chain 330 and the gears 370, 371 as the chain 330 moves up and down in response to passing waves. Properly aligning the chain 330 with the gears 370, 371 may reduce stress on the generator (not shown) and allow for a more efficient transference of wave energy to the generator.

Figure 4:
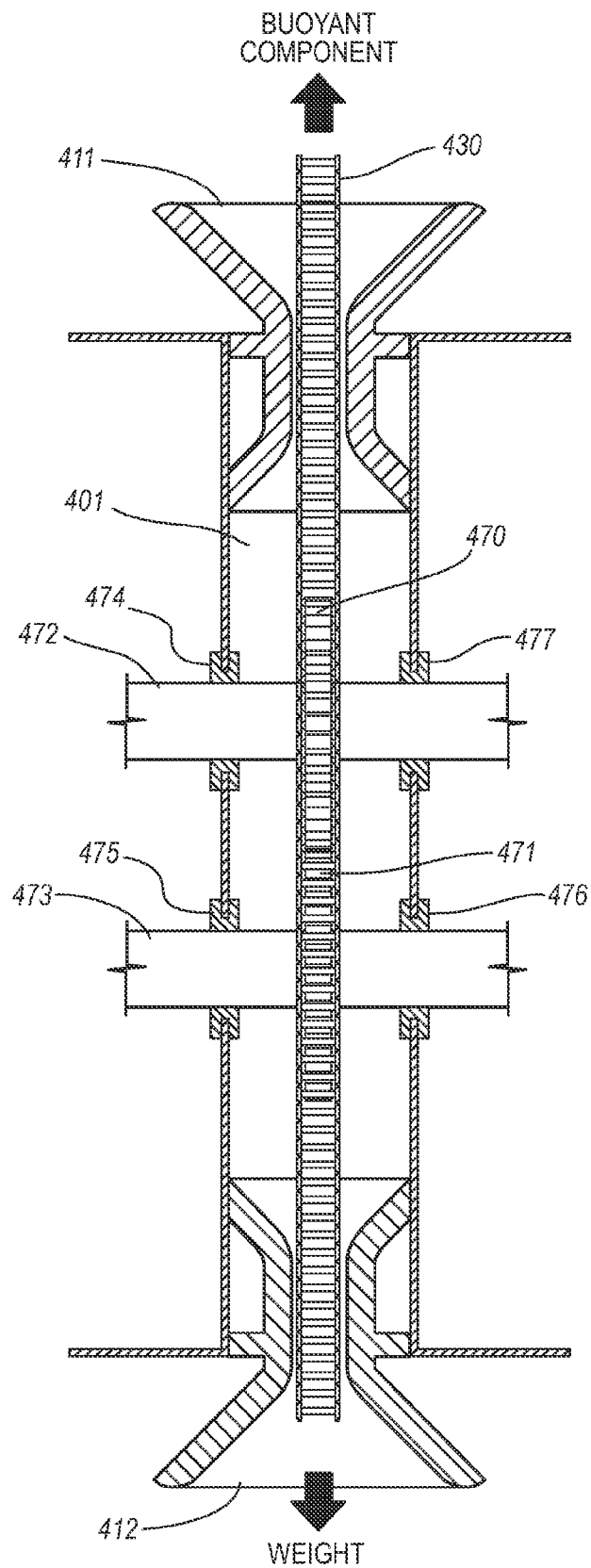
FIG. 4 shows a compartment within a submersed platform through which a chain connected to a buoyant component may pass.

FIG. 4 shows a compartment 401 housing the gears 470, 471 and driveshafts 472, 473. The compartment 401 may be open to the water. The driveshafts 472, 473 may be connected to water-tight bearings 474, 475, 476, 477. The water-tight bearings 474, 475, 476, 477 ensure that water remains confined to the compartment 401. FIG. 4 further illustrates that the funnel shaped structures 411, 412 may align the chain 430 with the gears 470, 471.

Figure 5:
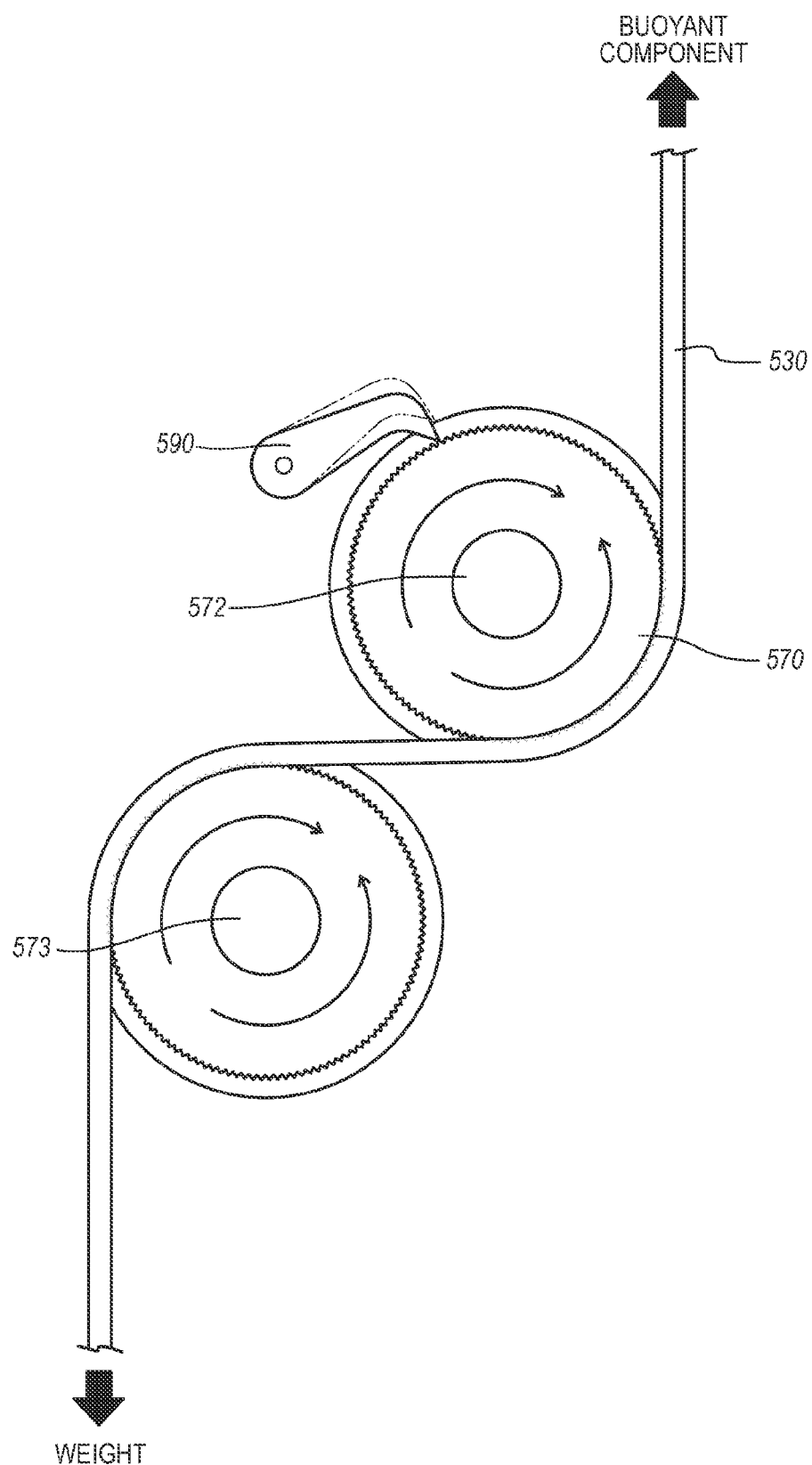
FIG. 5 illustrates an embodiment wherein a cable transfers the motion of the buoyant component to an axle.

FIG. 5 illustrates an embodiment wherein a cable 530 is connected to the buoyant component. The cable 530 may be wound one or more times around driveshafts 572, 573 and may transfer motion by friction between the cable 530 and the driveshafts 572, 573. In such an embodiment, a gear 570 and a ratcheting mechanism 590 may also be connected to driveshaft 572 for selectively restricting the movement of the buoyant component.

Figure 6:
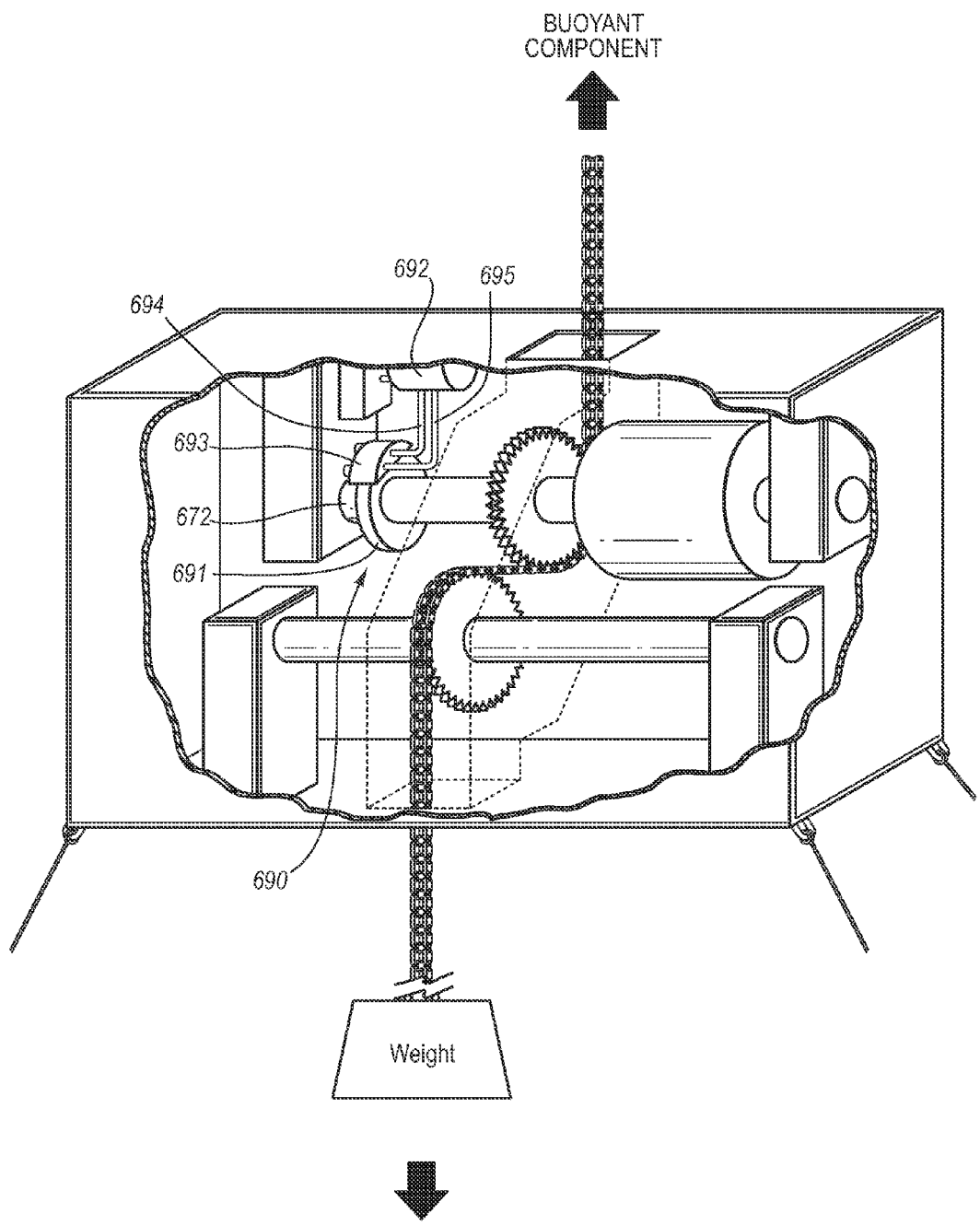
FIG. 6 illustrates a disc brake system that may be used to selectively restrict a buoyant component from rising strictly along with passing waves.

FIG. 6 illustrates an embodiment incorporating a disc brake system 690 that may be used to selectively restrict the buoyant component from rising strictly along with passing waves. The disc braking system 690 may comprise a disc 691 connected to a driveshaft 672, and a caliper 693. The caliper 693 houses one or more pistons (not shown), and may receive the disc 691 between the pistons. In operation, the pistons may mechanically, hydraulically, or pneumatically force a brake pad (not shown) against the disc 691, causing the disc 691 to slow or remain stationary due to the friction between the brake pad and the disc 691. A pump 692 may be configured to selectively engage and disengage the disc brake system 690. The pump 692 may be connected to the pistons housing within the caliper 693 by tubes 694, 695, which may transfer hydraulic or pneumatic pressure.

Figure 7:
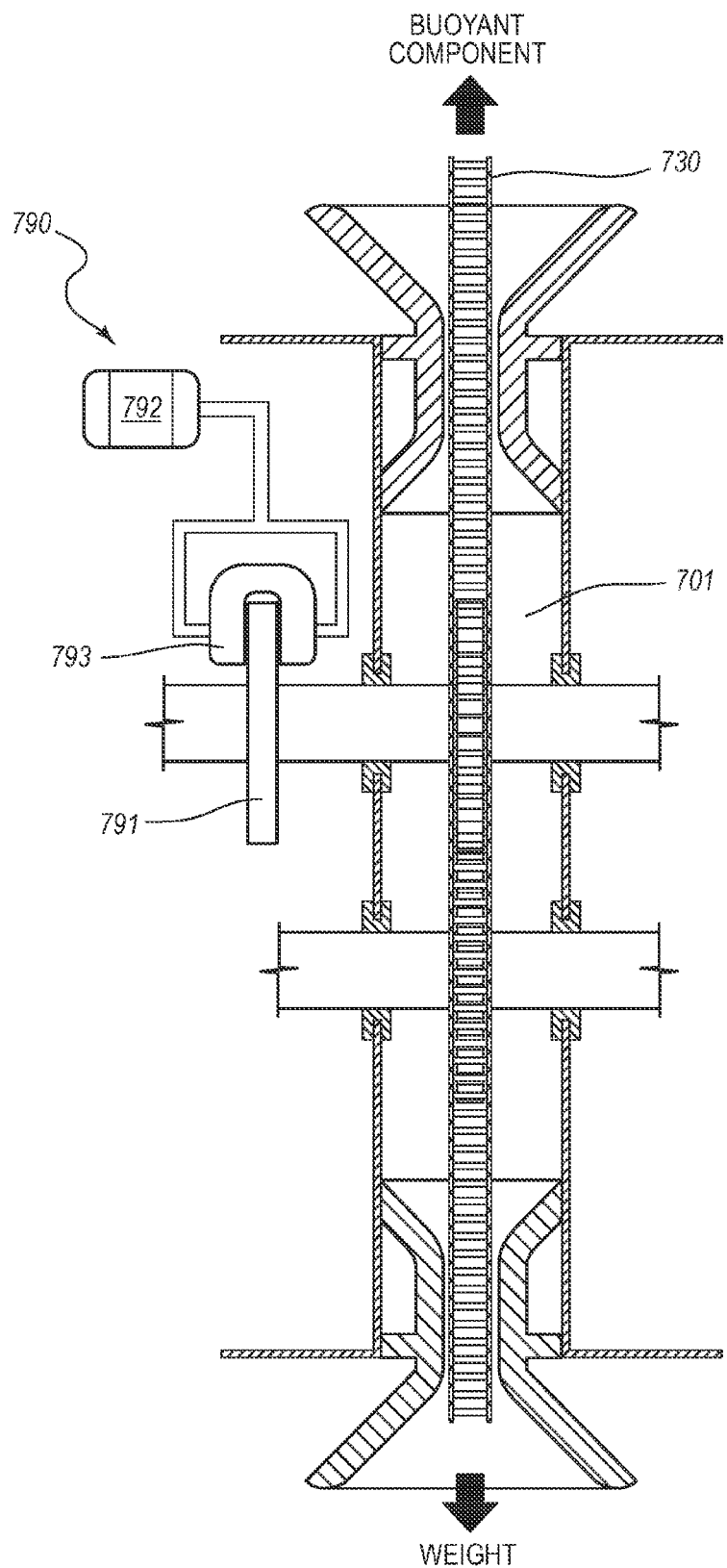
FIG. 7 illustrates an alternative embodiment of a disc brake system that may be used to selectively restrict the buoyant component from rising strictly along with passing waves.

FIG. 7 illustrates additional details of an embodiment incorporating a disc brake system 790. The disc brake system 790 may be located outside of a chamber 701, which may be open to the water and through which a chain 730 moves in response to passing waves. The disc brake system 790 comprises a hydraulic pump 792, a caliper 793, and a disc 791. The hydraulic pump 792 is in fluid communication with pistons (not shown) housed within the caliper 793.

Figure 8A:
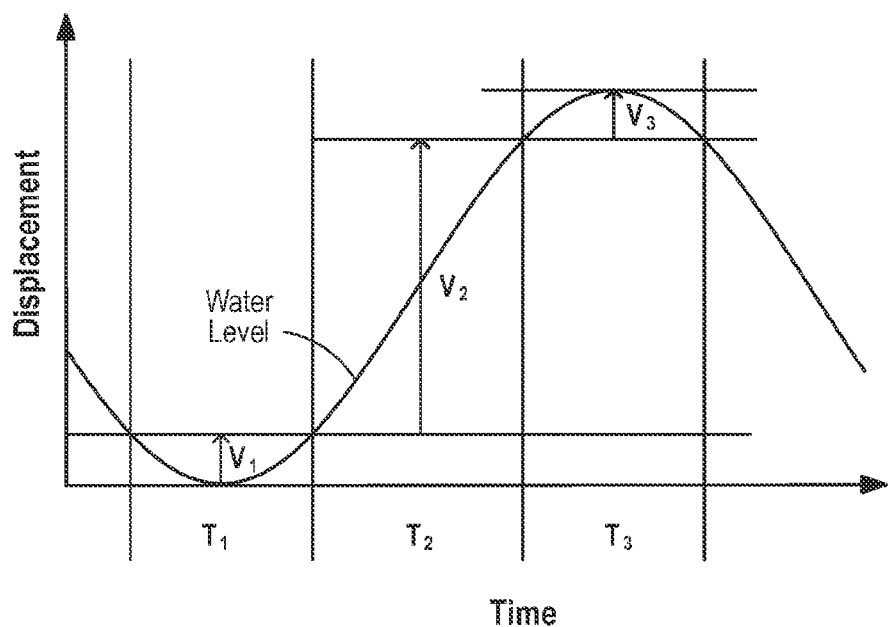
FIG. 8A illustrates the vertical displacement of a wave in three time periods.
Figure 8B:
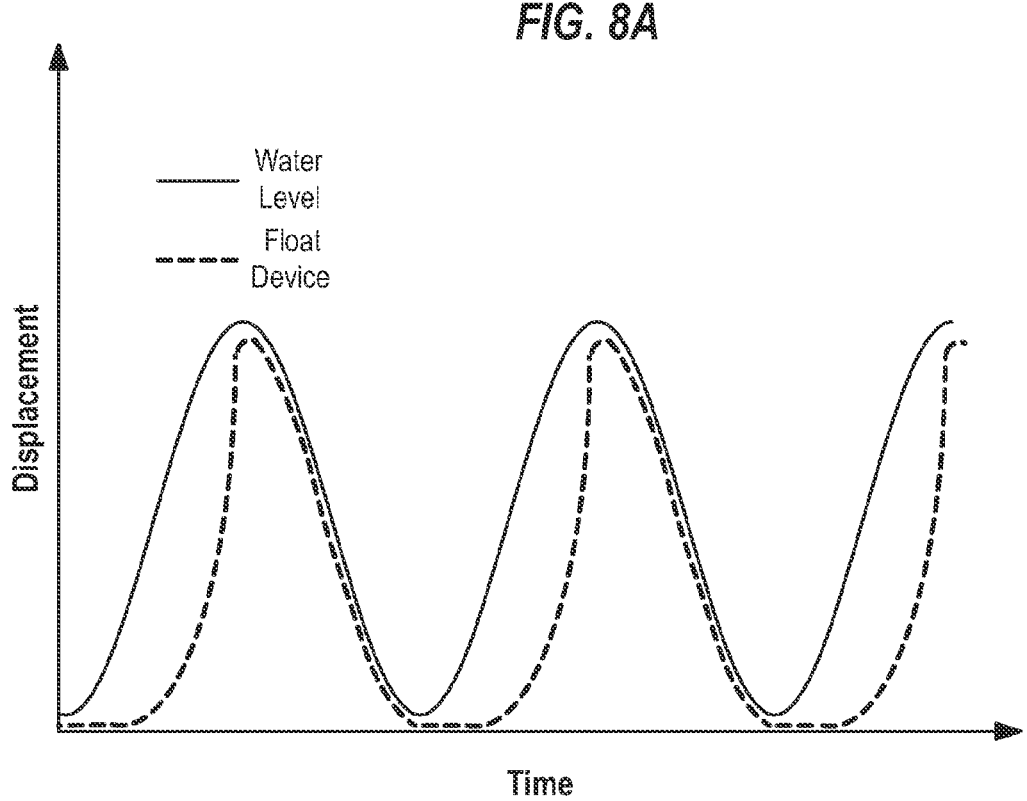
FIG. 8B illustrates the position of a buoyant component that is selectively restricted from rising strictly along with passing waves.

FIGS. 8A and 8B illustrate one advantage realized by restricting the buoyant component of a wave energy conversion device from rising strictly along with a passing wave. Restricting the buoyant component may allow for harnessing a greater amount of energy from passing waves in cases where a minimum amount of angular velocity is required to generate useful power. One such case is the generation of electrical power, which requires that an electromechanical generator run at a near constant speed. As discussed above, a clutch, freewheel, and flywheel may be utilized to drive the input of a generator in a single direction at a relatively constant speed. If the movement of a buoyant component does not generate sufficient angular velocity at the generator input, the movement will not generate electricity.

FIG. 8A shows a sinusoidal wave (approximating a fluid wave in a body of water) divided into three time periods, $T_1$, $T_2$, and $T_3$. The vertical displacement in each of these time periods is designated respectively as $V_1$, $V_2$ and $V_3$. As illustrated, the vertical displacement $V_1$ in time period $T_1$ and the vertical displacement $V_3$ in time period $T_3$, are small in comparison to the vertical displacement $V_2$ in time period $T_2$. Accordingly, during time periods $T_1$ and $T_3$ vertical acceleration is small, and the angular velocity created by the motion at the input of a generator would also be small. Referring to the embodiment depicted in FIG. 2, during periods $T_1$ and $T_3$ it is likely that the flywheel 276 would be rotating faster than the gear 270 connected to the driveshaft 272. Accordingly, the generator 280 is not being driven by the motion of the buoyant component during these time periods, and the system is unable to harness the wave's energy during these time periods.

FIG. 8B shows the position of a buoyant component with respect to the water level as a series of waves pass over a buoyant component. As is illustrated, the buoyant component is restrained from rising strictly with the passing waves. As the buoyant component is restrained from rising along with a passing wave, a buoyant force acts against the buoyant component according to the formula $F_{Net}=mg-\rho Vg$, where m is the mass of the buoyant component, $\rho$ is the density of the liquid, V is the volume of the buoyant component, and g is the acceleration due to gravity. Assuming that the volume of the buoyant component remains constant while partially or fully submerged, the force results in a constant acceleration, and a second order function (i.e. parabolic) of position over time. In other words, the total vertical displacement (i.e. the change in position from the wave's trough to the wave's crest) is completed in less time.

As illustrated in FIG. 8B, the buoyant component may be restrained as long as possible, and released at a point relative to the passing wave such that the buoyant component ascends to the surface at approximately the same time as the crest of a passing wave. Accordingly, the vertical displacement of the buoyant component corresponds to the full amplitude of a passing wave; however, the buoyant component travels the distance in a time period that is shorter than the period of the passing wave. Returning to the embodiment depicted in FIG. 2, in such a system, the angular rotation of the drive shaft 272 will accelerate to match the rotational speed of the flywheel 276 earlier in the wave's period. By accelerating more quickly, more of the energy of a passing wave may be harnessed for generating useful power.

FIG. 9A illustrates an embodiment of a wave energy conversion device 900 wherein the buoyant component 920 is configured to orient itself in the direction of propagation of passing waves. As waves pass, the buoyant component 920 will be carried some distance in the direction of wave propagation (as shown in phantom). The distance the buoyant component 920 moves may be increased by restricting the buoyant component 920 from rising strictly with passing waves. After a wave passes, the buoyant component 920 must return to a position substantially above a submersed platform 910. As a wave passes, the weight 950 will pull the buoyant component 920 to a position substantially above the submersed platform 910. In order to facilitate the return of the buoyant component 920 to a position substantially above the submersed platform 910, the buoyant component 920 may be shaped so as to orient itself in the direction of wave propagation.

FIG. 9B is a side view of one embodiment of the buoyant component 920. The buoyant component 920 includes a keel 921 and two symmetrical bows 922, 923. FIG. 9C is a side view of another embodiment of a buoyant component 925 that includes a sail 926 that, in conjunction with a keel 927, serves to keep the buoyant component 925 oriented in the direction of wave propagation. In one embodiment, the shape of the buoyant component 925 is optimized to move a little as possible laterally with the wave, but easy to pull back in position.

FIG. 9D is a bottom view of the buoyant components 920 shown in FIG. 9B. These components may be identical to those of FIG. 9C. As illustrated, the buoyant component 920 may be elliptical in shape, and the keel 921 and sail 926 (if present) may be disposed along the major axis of the buoyant component 920. As the buoyant component 920 is pulled back to a position substantially above the submersed platform 910, the direction of travel will be opposite the direction of wave propagation. The minimum resistance moving through the water will be realized when the buoyant component 920 is oriented in the direction of wave propagation.

Figure 10:
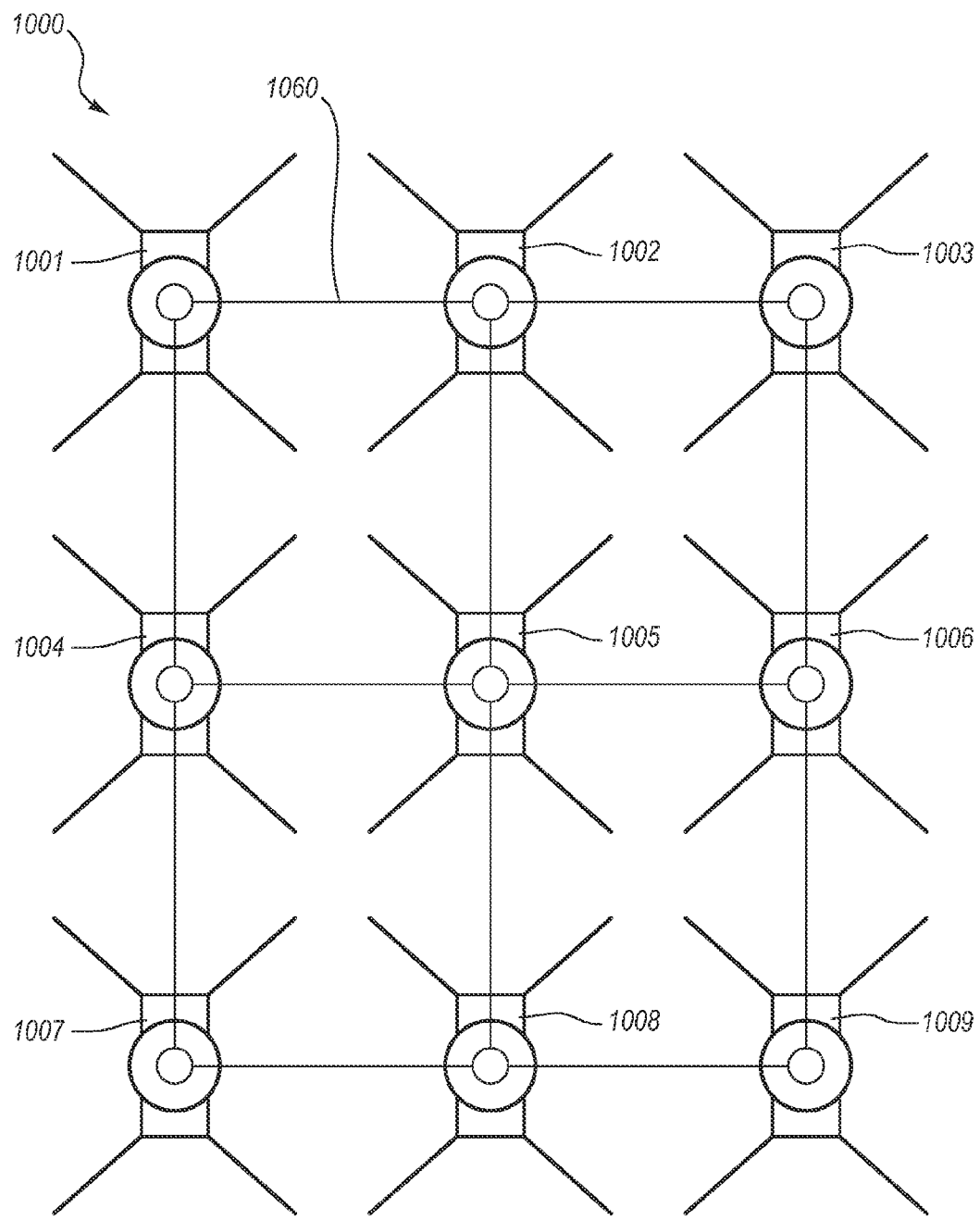
FIG. 10 illustrates a system comprising a plurality of wave energy conversion devices linked by a communications network

FIG. 10 illustrates a system 1000 for harnessing the power of a wave comprising a plurality of wave energy conversion devices 1001-1009 linked by a communications network 1060. The wave energy conversion devices 1001-1009 may gather information regarding a wave (e.g., wave height, duration, speed of propagation, direction, etc.). This information may be derived by incorporating sensors into the wave energy conversion devices 1001-1009. For example, a sensor may monitor the approximate vertical displacement of a buoyant component caused by a passing wave by monitoring the number of revolutions of the input of a generator (not shown). A passing wave's speed of propagation may be determined by comparing the time a trough of a wave is encountered by wave energy conversion devices that are positioned a known distance apart and dividing the time differed by the distance between the devices. Wave duration may be determined by measuring a time difference between two wave troughs. Each of the wave energy conversion devices 1001-1009 may include sensors for determining, for example, this information and/or other information about the characteristics of a wave.

Information about passing waves may be communicated from one device to another in order to optimize the performance of the system 1000 of wave energy conversion devices. Forms of optimization may include maximizing the energy harnessed from a passing wave, providing a constant power output, and the like. For example, the system may attempt to maximize the amount of energy generated from a passing wave by using information about the wave height, duration, and speed of propagation to calculate a time for releasing a restricted buoyant component, such that the buoyant component is restrained as long as possible but still rises to the peak of a passing wave. In this way, the float device travels the maximum distance in the shortest time interval. In another example, the system may control its power generation by staggering the release of buoyant components in the system in order to maintain a constant power output. Even in embodiments incorporating a flywheel (as illustrated in FIG. 3) or other device to maintain rotation of a generator's input during a falling wave, power generation will be greater when the generator's input is being driven by the rise of the buoyant component during a passing wave. Coordinating the release of a plurality of buoyant components in an array of wave energy conversion devices may moderate variations in the power output of individual wave energy conversion devices. For example, the system may coordinate the release of two buoyant components such that the point of peak power generation from one wave energy conversion device coincides with the lowest point of power generation of the other device. In this way the average power output is made more consistent. Further, the average power output may be made more consistent by increasing the number of wave energy conversion devices utilized.

The communications network 1060 may be implemented in a variety of forms. The network structure may connect adjacent wave energy conversion devices (e.g. device 1001 is connected to devices 1002 and 1004). In alternative embodiments, a star topology may be used such that each node is connected to a central node that processes information and directs wave energy conversion devices in the array to selectively restrict and release respective buoyant components. The physical architecture of the network may be wired or wireless. The communications network 1060 may employ standard protocols, (e.g. TCP/IP), or may employ proprietary protocols. In embodiments where the communications network 1060 is a wireless network, the network may employ wireless technologies including but not limited to IEEE 802.11 (a/b/g/n), Bluetooth, ultra-wide band, and the like.

Figure 11B:
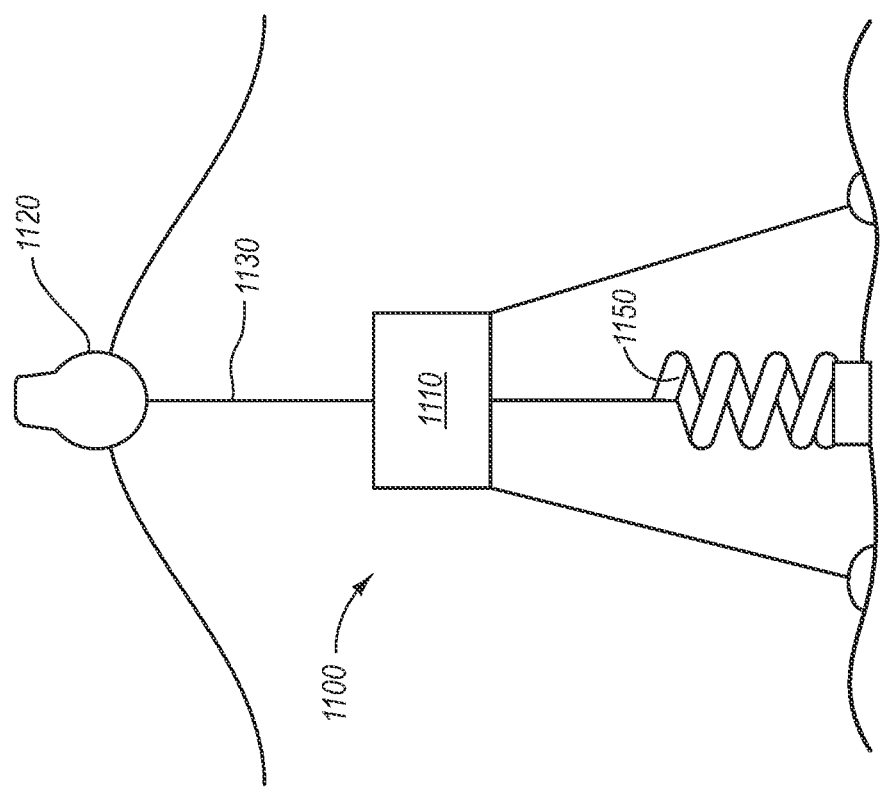
FIG. 11A and FIG. 11B illustrate an embodiment of a wave energy conversion device wherein a spring maintains tension in a cable as the buoyant component falls along with passing waves.
Figure 11A:
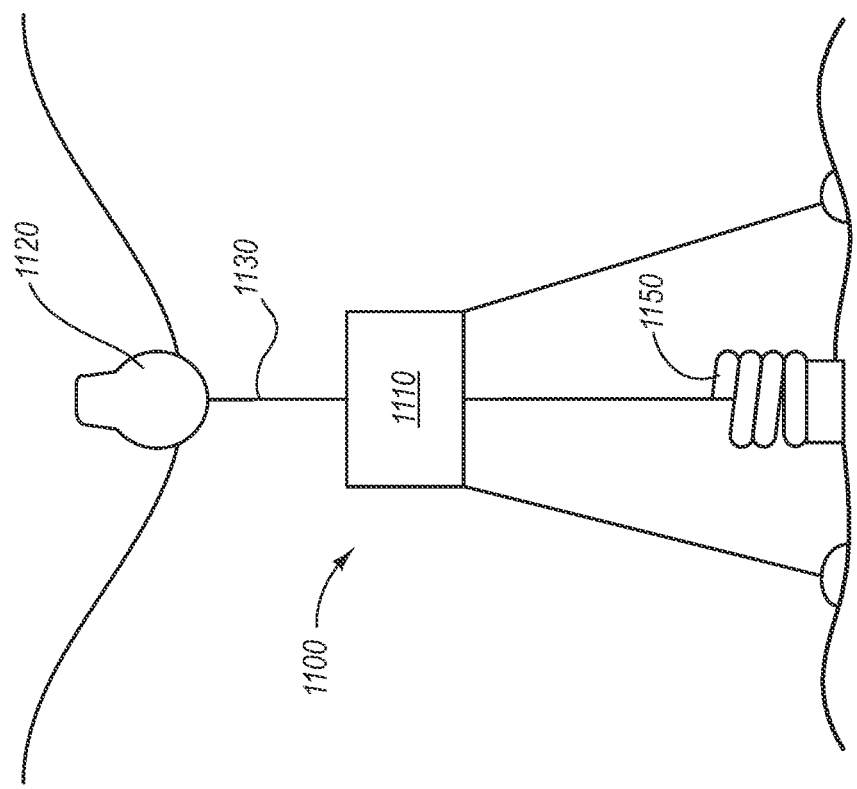

FIG. 11A and FIG. 11B illustrate an embodiment of a wave energy conversion device 1100 wherein a spring 1150 acts as a biasing mechanism that stores potential energy as the buoyant component 1120 rises along with passing waves, and releases stored potential energy as the buoyant component 1120 falls along with passing waves. FIG. 11A shows the buoyant component 1120 at the trough of a wave and the spring 1150 in an equilibrium position. FIG. 11B shows the buoyant component 1120 at the crest of a wave and the spring 1150 fully extended. In the position shown in FIG. 11B, the spring 1150 has stored potential energy. The potential energy stored in the spring 1150 will be released as the wave passes and the buoyant component 1120 falls along with the passing wave. The spring 1150 may maintain a tension in a cable 1130 as the buoyant component 1120 falls along with passing waves, and to ensure that the buoyant component 1120 returns to a position substantially above the submersed platform 1110. In another embodiment, a variable torque motor (not shown) may be connected to the cable 1130 and may be operable to maintain a tension in the cable while the buoyant component falls along with passing waves. The variable torque motor may be housed within the submersed platform 1110.

In the illustrated embodiment, the spring 1150 is attached to the sea floor. In alternative embodiments, however, the spring may be disposed within the platform 1100 or the cable between the platform 1100 and the sea floor.

In alternative embodiments, a restricting mechanism (e.g. the ratcheting system shown in FIG. 2, or the disc brake system shown in FIGS. 6 and 7) may selectively restrict the spring 1150 from releasing stored potential energy as the buoyant component 1120 falls along with passing waves. The spring 1150 may be connected to a second generator, such that the potential energy stored in the biasing mechanism is transferable from the spring 1150 to the second generator. The restricting mechanism may release the spring 1150 at a optimal point during a passing wave, so as to maximize the force generated at the input of the second generator as the spring 1150 returns to the equilibrium position shown in FIG. 11A. Advantages similar to those realized by restricting a buoyant component from rising strictly along with passing waves may be realized by restricting the spring 1150 from returning to the equilibrium position shown in FIG. 11A as the buoyant component 1120 falls along with passing waves. The weight shown in FIG. 1 may be substituted in place of the spring 1150 as an alternative embodiment of a biasing mechanism.

The terms, descriptions, examples, and embodiments used herein are set forth by way of illustration only and are not meant as limitations. Those skilled in the art will recognize that numerous variations and modifications can be made to the details of the above-described embodiments without departing from the underlying principles of the invention. The scope of the invention should therefore be determined only by the claims, and their equivalents.

The invention claimed is:

1. A system for harnessing wave energy, comprising:
a submersed platform positioned under a surface of a body of water and moored to a floor of the body of water;
a buoyant component connected to the submersed platform;
a generator connected to the buoyant component such that wave energy is transferable from the buoyant component to the generator; and
a restricting mechanism connected with the submersed platform, wherein the restricting mechanism is configured to selectively restrict the buoyant component from rising strictly along with passing waves.

2. The system of claim 1, wherein the restricting mechanism is configured to release the buoyant component when a buoyant force on the buoyant component reaches a threshold level.

3. The system of claim 1, wherein the restricting mechanism is configured to release the buoyant component such that the buoyant component ascends to the surface at substantially the same time as a crest of passing waves.

4. The system of claim 1, wherein the restricting mechanism is configured to release the buoyant component so as to maximize an amount of wave energy transferable from the buoyant component to the generator.

5. The system of claim 1, further comprising:
a sensor configured to identify information regarding passing waves;
wherein the information regarding passing waves is utilized to determine when the restricting mechanism releases the buoyant component.

6. The system of claim 1, wherein the submersed platform is buoyant.

7. The system of claim 1, further comprising a biasing mechanism connected to the buoyant component, wherein the biasing mechanism stores potential energy as the buoyant component rises along with passing waves, and releases stored potential energy as the buoyant component falls along with passing waves.

8. The system of claim 7, wherein the biasing mechanism comprises a weight.

9. The system of claim 7, wherein the biasing mechanism is selected from the group consisting of a spring and a motor.

10. The system of claim 7, further comprising a second generator connected to the biasing mechanism such that potential energy stored in the biasing mechanism is transferable from the biasing mechanism to the second generator.

11. The system of claim 7, wherein the restricting mechanism is further configured to selectively restrict the biasing mechanism from releasing stored potential energy as the buoyant component falls along with passing waves.

12. The system of claim 1, further comprising:
a cable connected to the buoyant component; and
a variable torque motor connected to the cable; the variable torque motor operable to maintain a tension in the cable while the buoyant component falls along with passing waves.

13. The system of claim 1, wherein the generator comprises a water pump.

14. The system of claim 13, further comprising: a reservoir connected to the water pump; and an electromechanical generator connected to the reservoir, the electromechanical generator operable to generate electricity from the movement of water released from the reservoir.

15. The system of claim 1, wherein the generator comprises an air pump.

16. The system of claim 15, further comprising a reservoir connected to the air pump, and an electromechanical generator connected to the reservoir; the electromechanical generator operable to generate electricity from the movement of air released from the reservoir.

17. The system of claim 1, wherein the restricting mechanism comprises a ratcheting system.

18. The system of claim 1, wherein the restricting mechanism comprises a disc brake system.

19. The system of claim 1, wherein the buoyant component is configured to orient itself substantially in the direction of propagation of passing waves.

20. The system of claim 19, wherein the buoyant component comprises a keel and two substantially symmetrical bows.

21. The system of claim 1, further comprising:
a clutch, the clutch comprising:
an input connected to the buoyant component; and
an output connected to the generator; the output connected to the input only in the direction of rotation corresponding to the upward motion of the buoyant component.

22. The system of claim 1, wherein the generator comprises an electromechanical generator.

23. The system of claim 22, further comprising:
a clutch, the clutch comprising:
an input connected to the buoyant component; and
an output, the output connected to the input only in the direction of rotation corresponding to the upward motion of the buoyant component;
a freewheel comprising:
an input connected to the output of the clutch;
an output, the output connected to the input only when the angular velocity of the input is greater than the angular velocity of the output;
a flywheel disposed between the output of the freewheel and the electromechanical generator.

24. A method of harnessing wave energy, the method comprising:
positioning a submersed platform under a surface of a body of water;
mooring the submersed platform to a floor of the body of water;
connecting a buoyant component to a buoyant submersed platform under the surface of the body of water;
connecting a generator to the buoyant component such that wave energy is transferable from the buoyant component to the generator;
restricting the buoyant component from rising strictly along with passing waves.

25. The method of claim 24, further comprising releasing the buoyant component when the buoyant force on the buoyant component reaches a threshold level.

26. The method of claim 24, wherein the submersed platform is buoyant.

27. The method of claim 24, further comprising:
connecting a biasing mechanism connected to the buoyant component, wherein the biasing mechanism stores potential energy as the buoyant component rises along with passing waves, and releases stored potential energy as the buoyant component falls along with passing waves.

28. The method of claim 24, wherein the biasing mechanism comprises a weight.

29. The method of claim 24, wherein the biasing mechanism comprises a spring.

30. The method of claim 24, further comprising:
connecting a second generator to the biasing mechanism such that potential energy stored in the biasing mechanism is transferable from the biasing mechanism to the second generator.

31. The method of claim 24, further comprising:
connecting a cable to the buoyant component; and
connecting a variable torque motor to the cable; the variable torque motor operable to maintain a tension in the cable while the buoyant component falls along with passing waves.

32. The method of claim 24, wherein the generator comprises a water pump.

33. The method of claim 32, further comprising:
providing a reservoir connected to the water pump;
providing an electromechanical generator connected to the reservoir;
generating electricity from the movement of water released from the reservoir.

34. The method of claim 24, wherein the generator comprises an air pump.

35. The method of claim 34, further comprising:
providing a reservoir connected to the air pump;
providing an electromechanical generator connected to the reservoir;
generating electricity from the movement of air released from the reservoir.

36. The method of claim 24, wherein the restricting mechanism comprises a ratcheting system.

37. The method of claim 24, wherein the restricting mechanism comprises a disc brake system.

38. The method of claim 24, wherein the buoyant component is configured to orient itself substantially in the direction of propagation of passing waves.

39. The method of claim 38, wherein the buoyant component comprises a keel and two substantially symmetrical bows.

40. The method of claim 24, further comprising:
providing a clutch, the clutch comprising:
an input connected to the buoyant component; and
an output connected to the generator, the output connected to the input only in the direction of rotation corresponding to the upward motion of the buoyant component.

41. The method of claim 24, wherein the generator comprises an electromechanical generator.

42. The method of claim 41, further comprising:
providing a clutch, the clutch comprising:
an input connected to the buoyant component; and
an output, the output connected to the input only in the direction of rotation corresponding to the upward motion of the buoyant component;
providing a freewheel comprising:
an input connected to the output of the clutch;
an output, the output connected to the input only when the angular velocity of the input is greater than the angular velocity of the output;
providing a flywheel disposed between the output of the freewheel and the electromechanical generator.

43. A system for harnessing wave energy, comprising:
a plurality of wave energy conversion devices, each wave energy device comprising:
a buoyant component; and
a sensor configured to identify information regarding a wave;
a generator connected to at least one of the plurality of buoyant components such that wave energy is transferable from the buoyant component to the generator;
a communications network configured to communicate information regarding a wave from one wave energy conversion device to another.

44. The system of claim 43, further comprising:
a submersed platform connected to at least one of the plurality of buoyant components, the submersed platform positioned under the surface of a body of water and moored to the floor of the body of water; and
a restricting mechanism connected to each of the plurality of buoyant components, the restricting mechanisms configured to selectively restrict the buoyant components from rising strictly along with passing waves.

45. The system of claim 44, wherein the release of a plurality of the restricting mechanisms is coordinated using the communications network so as to maintain a constant power output.

46. The system of claim 44, wherein the release of a plurality of the restricting mechanisms is coordinated using the communications network so as to optimize the amount of energy harnessed from passing waves.

47. The system of claim 44, wherein the submersed platform is buoyant.

48. The system of claim 44, wherein at least one wave energy conversion device further comprises a weight connected to the buoyant component.

49. The system of claim 48, wherein the weight is connected to the generator.

50. The system of claim 44, wherein at least one wave energy conversion device further comprises:
a cable connected to the buoyant component; and
a variable torque motor connected to the cable; the variable torque motor operable to maintain a tension in the cable while the buoyant component falls along with passing waves.

51. The system of claim 44, wherein at least one wave energy conversion device further comprises:
a spring connected to the buoyant component such that the spring expands as the buoyant component rises along with passing waves and contracts as the buoyant component falls along with passing waves.

52. The system of claim 44, wherein the generator of at least one wave energy conversion device further comprises a water pump.

53. The system of claim 52, further comprising: a reservoir connected to the water pump of at least one wave energy conversion device; and an electromechanical generator connected to the reservoir, the electromechanical generator operable to generate electricity from the movement of water released from the reservoir.

54. The system of claim 44, wherein the generator of at least one wave energy conversion device further comprises an air pump.

55. The system of claim 54, further comprising a reservoir connected to the air pump, and an electromechanical generator connected to the reservoir, the electromechanical generator operable to generate electricity from the movement of air released from the reservoir.

56. The system of claim 44, wherein the restricting mechanism of at least one wave energy conversion device comprises a ratcheting system.

57. The system of claim 44, wherein the restricting mechanism of at least one wave energy conversion device comprises a disc brake system.

58. The system of claim 44, wherein the buoyant component of at least one wave energy conversion device is configured to orient itself in the direction of propagation of passing waves.

59. The system of claim 58, wherein the buoyant component of at least one wave energy conversion device comprises a keel and two symmetrical bows.

60. The system of claim 44, wherein at least one wave energy conversion device further comprises:
a clutch, the clutch comprising:
an input connected to the buoyant component; and
an output connected to the generator, the output connected to the input only in the direction of rotation corresponding to the upward motion of the buoyant component.

61. The system of claim 44, wherein the generator of at least one wave energy conversion device comprises an electromechanical generator.

62. The system of claim 61, wherein at least one wave energy conversion device further comprises:
a clutch, the clutch comprising:
an input connected to the buoyant component; and an output, the output connected to the input only in the direction of rotation corresponding to the upward motion of the buoyant component;

a freewheel comprising:
an input connected to the output of the clutch;
an output, the output connected to the input only when the angular velocity of the input is greater than the angular velocity of the output;

a flywheel disposed between the output of the freewheel and the electromechanical generator.

* * * * *